(12) United States Patent
Goker et al.

(10) Patent No.: US 8,773,800 B2
(45) Date of Patent: Jul. 8, 2014

(54) ADAPTIVE DISTURBANCE COMPENSATION WITH MULTI-RATE SYNCHRONIZED SAMPLING

(75) Inventors: Turguy Goker, Solana Beach, CA (US); Ming-chih Weng, Los Angeles, CA (US); Umang Mehta, Irvine, CA (US); Ryan Taylor, Los Angeles, CA (US)

(73) Assignee: Quantum Corporation, San Jose, CA (US)

( * ) Notice: Subject to any disclaimer, the term of this patent is extended or adjusted under 35 U.S.C. 154(b) by 943 days.

(21) Appl. No.: 12/900,919

(22) Filed: Oct. 8, 2010

(65) Prior Publication Data

US 2012/0087031 A1 Apr. 12, 2012

(51) Int. Cl.
*G11B 5/584* (2006.01)
(52) U.S. Cl.
USPC .......................................... 360/55; 360/77.12
(58) Field of Classification Search
None
See application file for complete search history.

(56) References Cited

U.S. PATENT DOCUMENTS

| | | | | |
|---|---|---|---|---|
| 5,663,847 | A * | 9/1997 | Abramovitch | 360/77.02 |
| 7,110,212 | B2 * | 9/2006 | Bui et al. | 360/77.12 |
| 7,265,935 | B2 * | 9/2007 | Bui et al. | 360/77.12 |
| 7,362,537 | B2 * | 4/2008 | Bui et al. | 360/77.13 |
| 7,623,318 | B1 * | 11/2009 | Chliwnyj et al. | 360/77.12 |
| 8,213,105 | B2 * | 7/2012 | Bui et al. | 360/77.12 |
| 8,432,634 | B2 * | 4/2013 | McAllister et al. | 360/77.12 |

* cited by examiner

*Primary Examiner* — Wayne Young
*Assistant Examiner* — James L Habermehl
(74) *Attorney, Agent, or Firm* — Baker Botts L.L.P.

(57) ABSTRACT

An apparatus and method for providing adaptive disturbance compensation with multi-rate synchronized sampling is disclosed herein. The dynamic disturbance occurring in a media drive during read/write operations is attenuated using the adaptive disturbance compensation scheme. A plurality of compensation filters are used, each of the compensation filters configured to attenuate a disturbance caused by a particular source within the media drive. Each of the compensation filters is computed based on a sampling rate relevant to the respective disturbances.

31 Claims, 9 Drawing Sheets

ADAPTIVE DISTURBANCE COMPENSATION WITH MULTI-RATE SYNCHRONIZED SAMPLING

BACKGROUND

The present disclosure generally relates to storage media disturbance compensation. More particularly, the present invention relates to storage media disturbance compensation using more than one sample rate.

When accessing and/or writing data to optical discs, magnetic tape, or other types of data storage media, disturbances can occur at certain frequencies, resulting in distorted read/write operations. To minimize the distortions, compensation filters are employed to attenuate or suppress the disturbances. High bandwidth filters may be implemented to address a wide range of fixed and dynamic disturbances. Alternatively, narrower bandwidth filters may be employed if all of the disturbances can be identified beforehand using modeling or predictive algorithms.

In the case of magnetic tapes, they suffer from lateral tape motion (LTM) disturbance. LTM disturbance comprises dynamic events relating to tape speed and reel rotation rates that change over the length of the tape. The tape drive used to perform read/write operations includes a read/write head. The read/write head is configured to follow a specific track of the tape for a given time period. For example, the read/write head may follow a servo track of the tape. However, the presence of LTM disturbance causes the read/write head to laterally shift up or down relative to the track being followed (in a direction perpendicular to the longitudinal length of the track). If the disturbances are strong enough, the read/write head may lose the track being followed. As a result, if the tape drive was writing data previously, it needs to stop writing data temporarily to prevent writing to the adjacent track. Or if the tape drive was reading data previously, it may fail to read the data back since the reader is partially reading data from the adjacent track, and the tape drive needs to rewind the tape and attempt the read-retries. Such result would be detrimental to correct and rapid read/write operations. As tapes move to higher track density, higher data transfer rates, or higher tape speeds, LTM disturbance becomes even more of a problem.

BRIEF SUMMARY

Particular embodiments of the invention relate to a data storage media drive providing adaptive disturbance compensation. The drive includes a read/write head, a servo signal processing circuit, and an actuator in communication with the read/write head. The actuator is configured to control positions of the read/write head. The drive further includes a processor in communication with the actuator and the servo signal processing circuit, and is configured to provide at least one disturbance compensation signal to the actuator to compensate for a position displacement between the read/write head and a track of a data storage media. The disturbance compensation signal results from a sum of a plurality of compensation filters to which a position error signal has been applied. Each of the compensation filters corresponds to a specific source of disturbance contributing to the position displacement. Each of the compensation filters has a sampling rate relating to the respective specific source of disturbance.

Other embodiments of the invention relate to a computerized method for providing adaptive compensation of disturbances relating to read/write positions in a data storage media drive. The method includes obtaining a position error signal, and configuring a first compensation filter based on a first sampling rate. The first compensation filter is configured to attenuate a first type of disturbance contributing to the position error signal. The method further includes configuring a second compensation filter based on a second sampling rate. The second compensation filter is configured to attenuate a second type of disturbance contributing to the position error signal. The first and second sampling rates are different from each other. The method further includes combining outputs of the first and second compensation filters, and updating a read/write head position of the data storage media drive relative to a track of a data storage media using the combined compensation filters.

Yet other embodiments of the invention relate to a computer readable medium comprising program code for providing adaptive LTM disturbance compensation. The program code includes dynamically determining, in a processor, at least one attenuation frequency of a first compensation filter in accordance with at least one frequency of a first type of disturbance. The program code further includes dynamically determining, in the processor, at least one attenuation frequency of a second compensation filter in accordance with at least one frequency of a second type of disturbance. The program code also includes summing, in the processor, outputs of the first and second compensation filters. The first type of disturbance comprises a fixed mechanical disturbance and the second type of disturbance comprises at least one of a roller induced disturbance and a reel induced disturbance.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The example embodiments will become more fully understood from the following detailed description, taken in conjunction with the accompanying drawings, wherein the reference numeral denote similar elements, in which.

DETAILED DESCRIPTION OF EXAMPLE EMBODIMENT(S)

Figure 1:
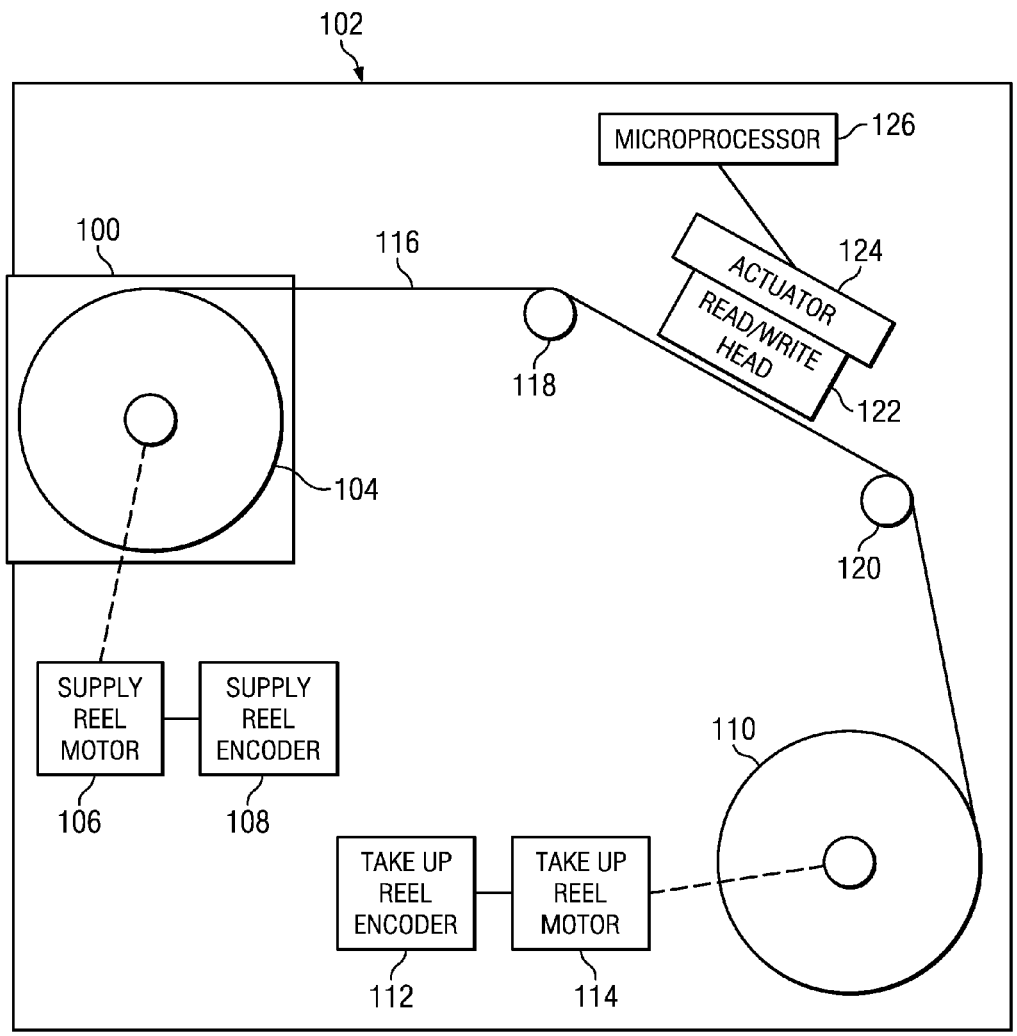
FIG. 1 illustrates one embodiment of a data storage media drive with an inserted portable data storage media.
Figure 1:
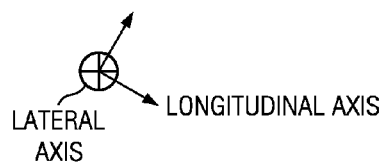

Described in detail below is an apparatus and method for providing adaptive disturbance cancelation for media drives. LTM disturbance compensation may be achieved using high bandwidth loop filters. Such solution requires algorithmic complexity, smaller moving mass, actuators, controllers, or noise feedback systems with complex designs, costly, and has implementation complexity. When designing servo loops, designers use higher bandwidth loops to attenuate LTM disturbances as the requirements for the tracking increase. This is basically a brute force method which has been done for many generations of drives. However higher bandwidth loops require improved PES detection, lower noise system, higher bandwidth mechanism and faster electronics, micro processors. If we analyze LTM, we would find out that it has specific regions of frequencies rich with disturbance, and quiet for the rest of the regions except for the random noise which is constant over the full frequency range. Some of these disturbance frequencies are fixed others move as a function of tape speed and tape position. In the case of the brute force method, we can see that the servo loop needs to provide maximum attenuation over the full range of frequency that results in higher bandwidth loops. However if we analyze the LTM response along with the loop attenuation response we can see that we are being wasteful in loop shaping by trying to attenuate regions with hardly any LTM disturbances at the expense of trying to provide required attenuation across the overall range. So if system had knowledge of LTM characteristics and able to separate these disturbances into different classification, we might be able to provide attenuation at regions of interest and less at the other regions where the LTM is not aggressive. By doing this we can limit the increase in the servo bandwidth as opposed to the brute force method where we have to have higher bandwidth systems. This results in optimum servo loop design that is better matched to the LTM frequency characteristics without requiring higher bandwidth mechanism and faster microprocessors resulting in lower cost yet still higher performance systems. Increasing bandwidth of servo systems may be quite difficult especially since it typically requires very responsive actuators that are normally hard to design and manufacture. Another way to attenuate LTM disturbance is to determine specific frequencies at which the disturbances occur, and apply narrower bandwidth filters centered at those specific frequencies. For example, if the tape speed is known, then the roller induced disturbance can be determined and compensated.

However, tape drives rarely operate the same way over time. Instead, tape drives operate at variable tape speeds and access different portions of the tape length, which means the tape reel rotation rates and reel diameters are also variable. These dynamic operating conditions cause dynamic LTM disturbance. This makes it difficult to implement a one-size-fits-all approach, such as using high bandwidth loop filters to cover all possible disturbances. A wide range of frequencies are involved and determining the correct loop shapes (including correct loop amplitudes) is not easy. If use of narrower bandwidth filters is desired in an environment of variable operating conditions, it requires recalculating filter coefficients every time the tape speed changes. But calculating new filter coefficients in an environment of dynamic tape speed is computationally daunting and requires a more powerful processor than is typically included in tape drives.

Thus, it would be beneficial to provide effective LTM disturbance attenuation without requiring high computational power, complex components (such as actuators, controllers, microprocessor, etc.), or costly implementation. It would be beneficial to provide LTM disturbance attenuation for a range of tape drive operating conditions. It would be beneficial to provide a compensation scheme that can be modularly modified to accommodate future upgrades. It would be beneficial to provide LTM disturbance compensation that facilitates steady data transfer rate without requiring expensive or complex compensation scheme. It would be beneficial for the media disturbance compensation scheme to be real-time (or near real-time) adaptive to a dynamically changing environment.

In one embodiment, a plurality, of compensation filters are used in parallel, each compensation filter configured to attenuate a particular type of disturbance. The sampling rate of each of these compensation filters is based on a time interval that is meaningful to the respective source of the disturbance. The compensation filters adaptively follow the frequencies at which the respective disturbances occur, thereby providing effective disturbance cancelation in real-time without undue computation requirements. The multiple sampling rates are synchronous to each other while the attenuation frequencies are specific to the frequencies of the disturbances. Thus, running specially computed filters at those specific synchronous rates to each disturbance achieves an optimal or improved suppression function.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Referring to FIG. 1, one embodiment of a top view of a tape drive system is shown. A portable data storage media, such a magnetic tape cartridge 100, is inserted into a media drive, such as a tape drive 102, to access data in and write data to the tape cartridge 100. The tape cartridge 100 is shown as a single reel tape cartridge. In alternative embodiments, the tape cartridge 100 can comprise a dual reel tape cartridge and the tape drive 102 can comprise a media drive appropriate for a dual reel tape cartridge. The tape cartridge 100 comprises a supply reel 104 and magnetic tape 116 wrapped around the supply reel 104. The magnetic tape 116 comprises at least one servo track and a plurality of data tracks running the longitudinal length of the tape. Each of these tracks is positioned parallel to each other.

When the tape cartridge 100 is inserted into the tape drive 102, one end of the magnetic tape 116 is taken up within the tape drive 102 to be wrapped around a take up reel 110 included in the tape drive 102. The magnetic tape 116 traverses a predefined path between the supply reel 104 and the take up reel 110. The predefined path is, at least in part, defined by one, two, or more rollers positioned at strategic positions along the predefined path. For example, rollers 118 and 120 guide the magnetic tape 116 along the predefined path. Rollers 118 and 120 may also aid in limiting gross lateral movement of the magnetic tape 116.

The tape drive 102 further includes a supply reel motor 106, a supply reel encoder 108, a take up reel motor 112, a take up reel encoder 114, a read/write head 122, an actuator 124, and a microprocessor 126. The supply reel motor 106 generates the necessary force to rotate the supply reel 104 at will. The supply reel encoder 108 (also referred to as a sensor or detector) is configured to output signals representing the pulse rate of the supply reel motor 106. The pulse rate specifies the number of reel revolutions caused by the supply reel motor 106 within each given unit of time. Thus, the supply reel encoder 108 permits the supply reel speed to be known.

The take up reel motor 112 and take up reel encoder 114 provide similar functions for the take up reel 110. The take up reel motor 112 generates the necessary force to rotate the take up reel 110 at will. The take up reel encoder 114 (also referred to as a sensor or detector) is configured to output signals representing the pulse rate of the take up reel motor 112. The pulse rate specifies the number of reel revolutions caused by the take up reel motor 112 within each given unit of time. Thus, the take up reel encoder 114 permits the take up reel speed to be known.

The read/write head 122 is configured to read and write data to the magnetic tape 116. The read/write head 112 is positioned in close proximity to the predefined path of the magnetic tape 116 such that as the magnetic tape 116 travels in the longitudinal direction (by being wound from the supply reel 104 to the take up reel 110 or vice versa) the read/write head 112 can read/write data to a particular track and longitudinal position of the magnetic tape 116. Data is read/written to the magnetic tape 116 as the tape is in continuous motion. In other words, it is rare for the tape to be stopped to read/write data and then restarted to read/write data at a different location. The read/write head 112 includes one or more servo elements configured to read the servo track(s) of the tape medium. A servo signal processing circuit is coupled to the servo element(s) to demodulate the signal(s) from the servo element(s) to output a position error signal which microprocessor 126 samples at a sampling rate.

The actuator 124 is configured to control the lateral position of the read/write head 122 relative to the magnetic tape 116 based on a signal provided by the microprocessor 126. (The lateral direction is into and out of the paper in FIG. 1.) The actuator 124 comprises a mechanical positioner to move the read/write head 122 up or down laterally. By controlling the lateral position of the read/write head 122 relative to the magnetic tape 116, a particular track of the magnetic tape 116 can be accessed.

The microprocessor 126 is in communication with the actuator 124 and a number of other components within the tape drive 102, including the servo signal processing circuit. For example, although not shown, each of the supply reel motor 106, supply reel encoder 108, take up reel motor 112, and take up encoder 114 is in communication with the microprocessor 126. As discussed in detail below, the microprocessor 126 is configured to receive position error signals from the servo signal processing circuit, filter them as described herein, and send control signals (filtered position error signals) to the actuator 124 specifying where the read/write head 122 should be positioned, and how fast and when the supply reel motor 106 and take up reel motor 112 should operate to achieve a desired tape speed.

The microprocessor 126 is configured to implement the adaptive disturbance cancellation using instructions provided in computer readable code. The code may directly cause the microprocessor 126 to perform specified operations, be compiled to do so, and/or be combined with other software, hardware, and/or firmware elements (e.g., libraries for performing standard functions) to do so. The microprocessor 126 may include a computer-readable storage medium to store the code (particular computer software or data), or the code may be stored in a separate computer-readable storage medium included in the tape drive 102. In an alternative embodiment, execution of the code for adaptive disturbance cancellation may be performed by a dedicated processor that is separate from the microprocessor 126 used for general operations of the tape drive 102. This dedicated processor may be internal or external to the tape drive 102.

Although not shown, the tape drive 102 can include additional read/write heads and associated actuators so that more than one track of the magnetic tape 116 can be read/written to simultaneously. For example, the servo track may have a dedicated read/write head and the data tracks may use a separate read/write head. The read/write head 122 may comprise two discrete components—one head for read operations and another head for write operations. It is contemplated that there may be more than one microprocessor included in the tape drive 102, as required to satisfy computational requirements. It is also contemplated that the tape drive 102 may include additional components, such as detectors (for example, for the rollers 118, 120), controllers, coils, power supply, and a variety of other components. It is understood that the components shown in FIG. 1 are not to scale, not necessarily in their proper location, and/or are simplified for ease of discussion. Some components may have been omitted to better illustrate the components under discussion.

A host, such as a server, communicates with the tape drive 102 and dictates data transfer to and from the tape cartridge 100 via the tape drive 102. The host and the tape drive 102 stay synchronized to each other. Otherwise, the magnetic tape 116 travel has to be stopped and wound in the opposite direction from which it was traversing to pick up missed data. Such interruption can add seconds to a read/write operation.

In order to optimize data transfer rate and to keep the host and tape drive 102 in synchronization, variable tape speed operation is used. With variable tape speed operation, the tape drive 102 changes the tape speed (e.g., longitudinal traversal of the magnetic tape 116 along the predefined path toward the supply reel 104 and/or take up reel 110) dynamically to keep the read/write operations as steady (at an apparent constant speed from the host's perspective) as possible.

One embodiment for providing adaptive disturbance cancellation using multi-rate sampling is described with reference to FIGS. 2 and 3.

Note that the code may directly cause the processor to perform specified operations, be compiled to do so, and/or be combined with other software, hardware, and/or firmware elements (e.g., libraries for performing standard functions) to do so.

Figure 2:
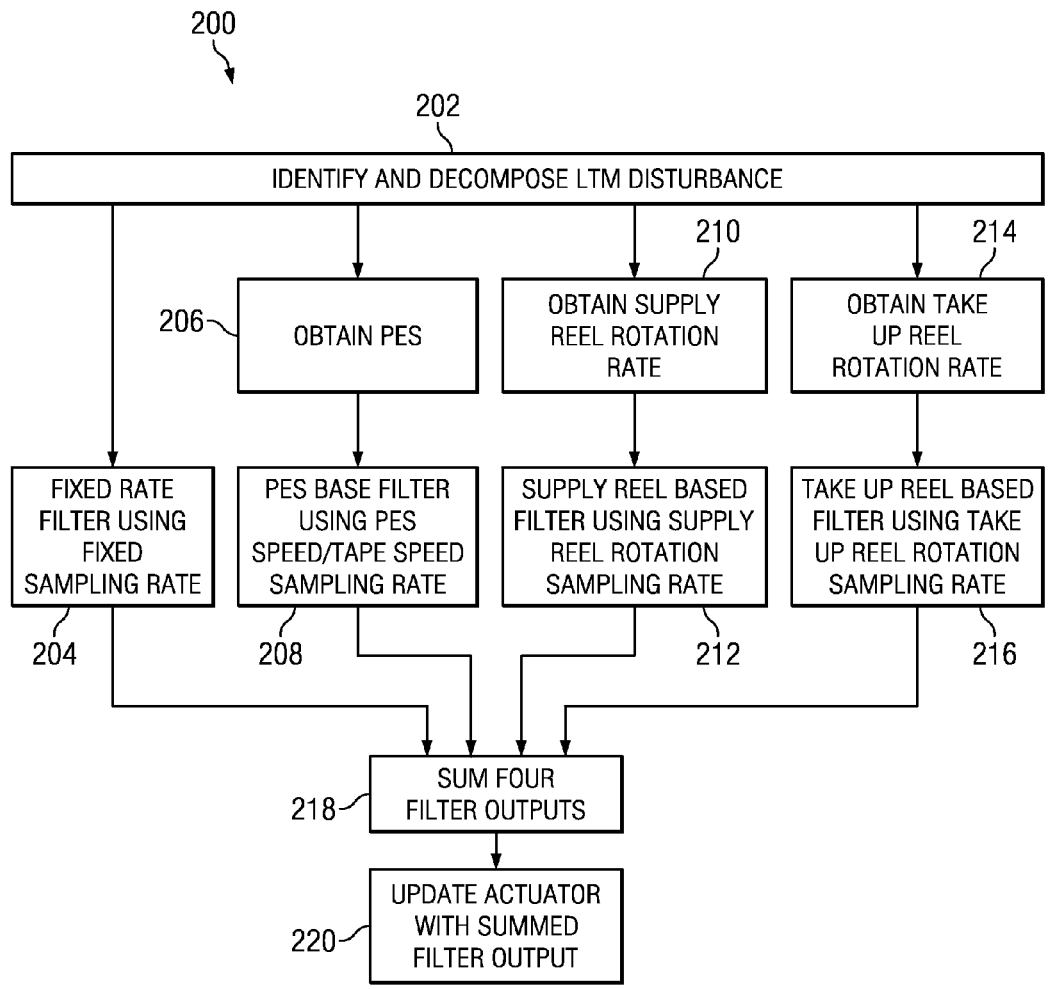
FIG. 2 illustrates one embodiment of a flow diagram for implementing adaptive disturbance compensation using multi-rate sampling.

FIG. 2 illustrates a flow diagram 200 including an identify and decompose lateral tape motion (LTM) disturbances block 202, an output fixed rate filter block 204, an obtain position error signal (PES) block 206, an output PES based filter block 208, an obtain supply reel rate block 210, an output supply reel rate filter block 212, an obtain take up reel rate block 214, an output take up reel rate filter block 216, a sum four filter outputs block 218, and an update actuator with summed filter outputs block 220.

At the block 202, sources of the LTM disturbance associated with variable tape speed operation are identified and decomposed. The first component of the LTM disturbance is caused by fixed vibrations, shocks, and other undesirable motion from mechanical components included in the tape drive 102. For example, there may be sharp vibrations that are (inherently) resident in the actuator 124. The frequency(ies) and magnitude of this fixed disturbance can be exactly identified, and they are known to repeat at a fixed repetition. This frequency (also referred to as the shock and vibration frequency, or fixed disturbance frequency) is fixed regardless of the tape speed or sample rate (the rate at which the relative position of the read/write head to the tape is detected). Thus, this fixed disturbance can be cancelled by applying a filter at the specific frequency at which the disturbance occurs and at a fixed repetition rate.

The second component of the LTM disturbance is attributable to the rollers (such as the rollers 118, 120) included in the tape drive 102. A roller induced disturbance occurs at a fundamental frequency and the harmonics of the fundamental frequency. For a given tape speed, the fundamental and harmonic frequencies are constant. However, at a different tape speed, the fundamental and harmonic frequencies change. As the tape speed changes linearly, so does the fundamental frequency. Typically, as the tape speed increases, so does the fundamental frequency. Thus, if the tape speed is known, the frequencies of the roller induced disturbance are also known.

The third component of the LTM disturbance is attributable to the supply reel 104 included in the tape drive 102. A supply reel induced disturbance (also referred to as a supply reel rotation disturbance) occurs due to variance in rotational speeds required from beginning-of-tape (BOT) to end-of-tape (EOT) of the tape 116 for the tape speed to stay constant. Part of the reason for the needed change in rotational speed stems from the amount of tape wound on the supply reel 104 changing (e.g., the supply reel diameter changes) going from BOT to EOT of the tape. The supply reel 104, via the supply reel motor 106, changes rotational speed from BOT to EOT according to the following relationship:

$$\text{Reel}_{freq} = \frac{1}{2\pi} \frac{TapeSpeed}{ReelRadius}$$

The supply reel induced disturbance occurs at a fundamental frequency and its harmonics. These frequencies are synchronous to the supply reel speed, not the tape speed. Although similar to the roller induced disturbance, the disturbance frequencies increase or decrease as the supply reel speed increases or decreases, respectively.

The fourth component of the LTM disturbance is attributable to the take up reel 112 included in the tape drive 102. A take up reel induced disturbance (also referred to as a take up reel rotation disturbance) is analogous to the supply reel induced disturbance described above except that it pertains to the take up reel 112. This disturbance occurs due to variance in rotational speeds required from BOT to EOT of the tape 116 for the tape speed to stay constant. The amount of tape wound on the take up reel 112 changes from BOT to EOT of the tape, requiring different take up reel rotation speed. The take up reel induced disturbance occurs at a fundamental frequency and its harmonics. These frequencies are synchronous to the take up reel speed, not the tape speed. And as the take up reel speed increases or decreases, the disturbance frequencies increase or decrease, respectively.

Once the LTM disturbance is decomposed, each component disturbance can be separately addressed and refreshed at its respective relevant repetition rate. At the block 204, the first component of the LTM disturbance—the fixed disturbance—is addressed. At every fixed rate $T_s$ (denoted as block 302 in FIG. 3), a precompiled compensation filter with a pre-established frequency response (denoted as block 304 in FIG. 3) is outputted. This fixed rate filter establishes a stable nominal servo loop as a baseline; this loop includes integrators, loop compensation filters and notch filters to control the structural actuator resonances that are normally found to be at higher frequencies. In addition to the loop compensation filters, this block also contains band limited filters to deal with attenuating fixed frequency disturbances such as vibration. Because the fixed disturbance is not a function of the tape speed, sample rate, or other operational parameters of the tape drive 102, the fixed rate $T_s$ can be independently selected. For example, the fixed rate may be the sample rate.

At the block 206, a position error signal (PES) is received to set the refresh rate of the compensation filter for the second component of the LTM disturbance—the roller induced disturbance. The PES comprises a feedback signal providing the lateral displacement of the read/write head 122 relative to a specific track of the tape 116. For example, if a servo track react/write head or the servo track of the tape 116 moves up or down relative to each other, then the servo track read/write head generates a PES. The servo track of the tape 116 includes timing feedback information (or referred to as frame lengths) at certain periodic positions along the longitudinal length of the tape (e.g., every 50, 100, or 200 micrometers). The PES is a function of the timing feedback (which specifies fixed, known distances of the tape) and the tape speed. Hence, the PES provides the points in time when a position error occurred. The PES is received by the microprocessor 126 to configure a PES based compensation filter.

Next, at the block 208, the PES is used to configure the PES based filter. The timing of the PES detection synchronously follows the tape speed. In other words, as the tape speed increases, the more often PES detection occurs within a unit of time because more timing feedback points on the tape are traversed within the unit of time. Accordingly, any filter designed to cancel the roller induced disturbance can follow the tape speed. The filter can be refreshed or updated based on the tape speed (block 306 of FIG. 3). The PES based filter is self-adaptive.

The shape of the compensation filter can be precompiled, as the shape stays the same while its frequency scales with the PES/tape speed. The microprocessor 126 is configured to use the received PES to determine the current fundamental and harmonic frequencies at which the roller induced disturbance is occurring. The compensation filter is then configured to suppress the disturbance at those frequencies. If in the next cycle the PES detection rate has changed, then the disturbance-compensating frequencies will also change to adaptively suppress the roller induced disturbance.

At the block 210, the microprocessor 126 receives a supply reel rotation speed from the supply reel encoder 108. The refresh or repetition rate of the compensation filter for the third component of the LTM disturbance—the supply reel rotation disturbance—can be based on the supply reel rotation speed (block 310 of FIG. 3). Unlike the roller induced disturbance, the supply reel rotation disturbance is not synchronous to tape speed; thus, it is more appropriate to base the supply reel compensation filter on the supply reel rotation speed. The supply reel rotation speed is a function of the tape speed and supply reel radius.

At the block 212, the microprocessor 126 refreshes or updates a compensation filter for the supply reel rotation disturbance based on the supply reel rotation speed. The fundamental and harmonic frequencies at which the disturbance occurs can be determined from the supply reel rotation speed; thus, the compensation filter can be designed to suppress the disturbances at those frequencies. The shape of the filter can be precompiled as it stays constant. If in the next cycle the supply reel rotation speed has changed, then the disturbance-compensating frequencies will also change to adaptively suppress the supply reel rotation disturbance.

At the blocks 214 and 216, filter implementation analogous to blocks 210 and 212, respectively, occurs except it is for the fourth component of the LTM disturbance—the take up reel rotation disturbance. The take up reel rotation speed received from the take up reel encoder 114 is used instead of the supply reel rotation speed, and the compensation filter is designed to cancel the take up reel rotation disturbance. The take up reel compensation filter is operable to adaptively suppress the take up reel rotation disturbance based on the take up reel rotation speed.

The four compensation filters are provided in parallel, even though the updating of any of the compensation filters occurs according to its applicable sampling rate. The outputs of the four compensation filters are summed by the microprocessor 126, at the block 218 (also block 318 in FIG. 3). The summed compensation filter outputs are then transmitted from the microprocessor 126 to the actuator 124, at the block 220 (also block 320 in FIG. 3). The summed filter outputs provided to the actuator 124 may be referred to as a filtered position error signal or disturbance compensation signal. When summing these filters, the summation is based on Partial Fraction Expansion methodology that is a known mathematical concept. This is normally part of the initial servo loop design phase. When computing these individual filters configured in parallel mode, we start at designing them in cascade form using fixed frequency sample rate just like the brute force method but using these individually shaped filters. Once we get the filters designed in nominal case at fixed sample rate, we apply the partial fraction expansion algorithm to separate these filters into distinct blocks that are configured in parallel mode, each one having its own unique sample rate. This becomes the final configuration that is described herein.

The blocks 204-220 repeat in successive synchronized multi-rate cycles to adaptively attenuate the dynamic LTM disturbance.

Due to each of the filters having its own relevant sampling rate, one or more of the blocks 210, 214, 204, 208, 212, 216 may not occur within a given cycle. The blocks 210, 214, 204, 208, 212, or 216 may also occur simultaneously or in an order different from that shown in FIG. 2.

Figure 3:
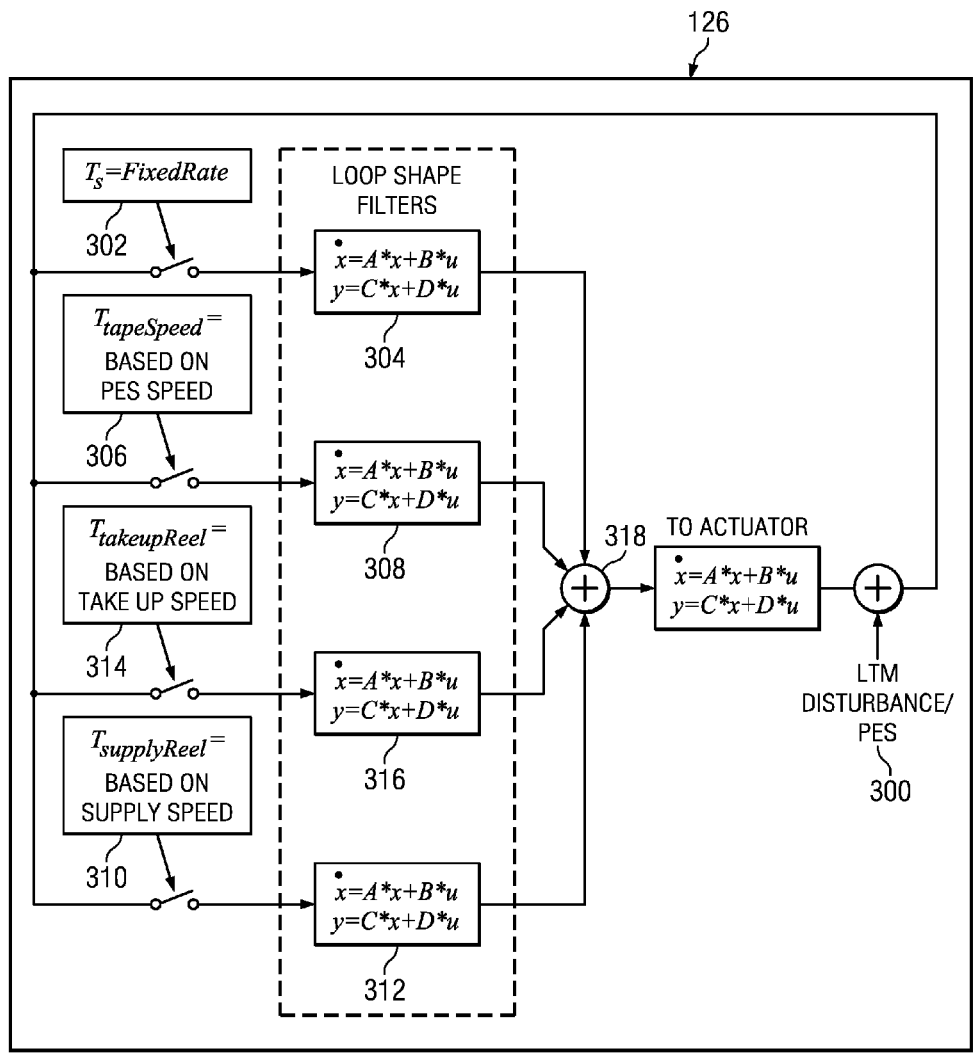
FIG. 3 illustrates one embodiment of a block diagram for implementing adaptive disturbance compensation using multi-rate synchronized sampling.

FIG. 3 illustrates one embodiment of a block diagram for adaptive compensation filtering using multi-rate sampling. This compensation scheme is carried out within the microprocessor 126 of the tape drive 102. A PES value representative of the LTM disturbance (item 300) forms a feedback loop to the inputs of the four compensation filters 304, 308, 312, 316 (collectively referred to as loop shape filters). In an ideal environment in which unwanted disturbances do not exist, once the microprocessor 126 specifies lateral position information to the actuator 124, the read/write head 122 would continuously follow a particular track of the tape 116. Under this scenario, there would be no LTM disturbance and thus, the PES would be zero (e.g., there is no lateral displacement between the read/write head 122 and a particular track of the tape 116). In a real-life environment, LTM disturbance exists. The LTM disturbance causes undesirable lateral position offset or displacement to occur between the read/write head 122 and the particular track of the tape 116. The amount of displacement is quantified by a non-zero PES value.

The tape drive 102 is configured to operate at a fixed sampling rate. An advantage of using a fixed sampling rate, instead of using variable sampling rate, is that recalculation of filter coefficients is not necessary (which is computationally difficult in a dynamic environment). But as explained above, the rate at which PES values are generated increases as the tape speed increases due to more timing feedback markers being traversed in the same unit of time. This means that the rate at which PES values are provided to the microprocessor 126 may be variable. The present compensation scheme handles the dynamic rate at which the PES values are received by the microprocessor 126 by reconfiguring the four compensation filters 304, 308, 312, 316 independently of each other and each at a rate relevant to what is causing the respective component disturbance.

The fixed rate filter 304 comprises a lower bandwidth loop shaped filter operable to suppress the fixed (wide band) disturbance component of the LTM disturbance. The fixed rate filter 304 is configured using standard filter equations, in which A, B, C, and D shown in FIG. 3 represent filter coefficients which are pre-calculated and remain constant. The fixed rate filter 304 is recomputed at a fixed time interval $T_s$ 302. The output of the fixed rate filter 304 remains until it is replaced with a new output. This way, if a sum of the four filter outputs is taken after an output of the fixed rate filter 304 has been computed but before the next output is recomputed, the last computed output will be used.

The PES based filter 308 comprises a tunable narrow band loop shaped filter operable to suppress the roller induced disturbance component of the LTM disturbance. The PES based filter 308 is configured using filter equations, in which A, B, C, and D shown in FIG. 3 represent filter coefficients which are pre-calculated and remain constant. The filter coefficients for the PES based filter 308 may be different from filter coefficients for any of the other filters. The PES based filter 308 is recomputed at the PES rate or based on the tape speed ($T_{tapespeed}$ 306). The shape of the PES based filter 308 is pre-computed and remains unchanged; the filter shape shifts up or down in frequency depending on the frequency (ies) at which the roller induced disturbance occurs, as specified by the PES detection rate. As with the fixed rate filter 304, the output of the PES based filter 308 also remains (to be summed, for example) until it is replaced with a new output.

The supply reel rotation based filter 312 comprises a tunable narrow band loop shaped filter operable to suppress the supply reel rotation induced disturbance component of the LTM disturbance. The supply reel rotation based filter 312 is configured using filter equations, in which A, B, C, and D shown in FIG. 3 represent filter coefficients which are pre-calculated and remain constant. The filter coefficients for the supply reel rotation based filter 312 may be different from filter coefficients for any of the other filters. The supply reel based filter 312 is recomputed in accordance with a supply reel rotation rate ($T_{supply\ reel}$ 310). The shape of the supply reel based filter 312 is pre-computed and remains unchanged; the filter shape shifts up or down in frequency depending on the frequency(ies) at which the supply reel rotation disturbance occurs, as specified by the supply reel rotation value. As with the fixed rate filter 304, the output of the supply reel based filter 312 also remains (to be summed, for example) until it is replaced with a new output.

The take up reel rotation based filter 316 comprises a tunable narrow band loop shaped filter operable to suppress the take up reel rotation induced disturbance component of the LTM disturbance. The take up reel rotation based filter 316 is configured using filter equations, in which A, B, C, and D shown in FIG. 3 represent filter coefficients which are pre-calculated and remain constant. The filter coefficients for the take up reel rotation based filter 316 may be different from filter coefficients for any of the other filters. The take up reel based filter 316 is recomputed in accordance with a take up reel rotation rate ($T_{take\ up\ reel}$ 314). The shape of the take up reel based filter 316 is pre-computed and remains unchanged; the filter shape shifts up or down in frequency depending on the frequency(ies) at which the take up reel rotation disturbance occurs, as specified by the take up reel rotation value. As with the fixed rate filter 304, the output of the take up reel based filter 316 also remains (to be summed, for example) until it is replaced with a new output.

The outputs of the compensation filters 304, 308, 312, 316 are summed 318 continuously or at certain time intervals. This compensation information (or filtered position error signal) is then fed to the actuator 124 in order to cancel the lateral position displacement between the read/write head 122 and a particular track of the tape 116 caused by the LTM disturbance. As an example, if the sum 318 is performed at certain time intervals, the time interval can be the PES generation rate, the sampling rate, or some other rate corresponding to the response rate of the actuator 124.

Figure 4:
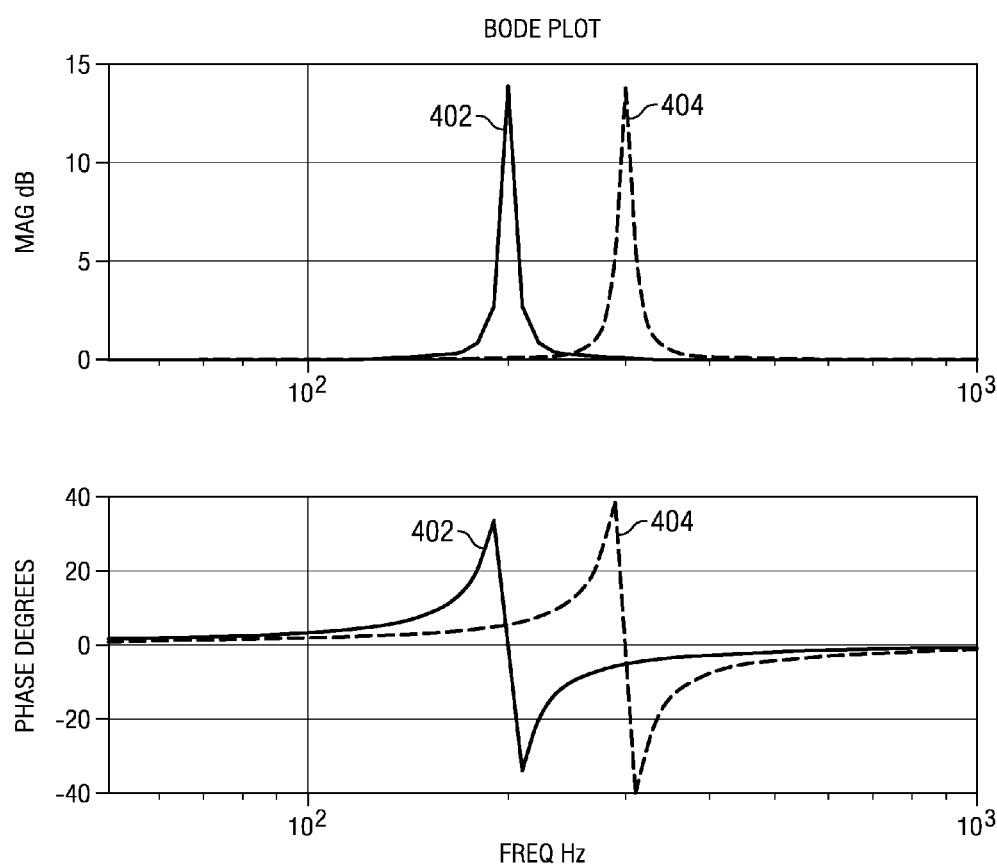
FIG. 4 illustrates a bode plot of an example narrow bandwidth filter.

Referring to FIG. 4, example narrow band filters, such as the filters 308, 312, or 316, are shown. Bode plots show each of the filters' magnitude and phase as a function of the frequency. A first filter 402 comprises a single spike narrow band filter (also referred to as a band limited filter) centered at 200 Hertz. A second filter 404 comprises another single spike narrow band filter centered at 300 Hertz. It is contemplated that the shape of the filters 308, 312, 316 may include one or more spikes. It is also contemplated that the shapes of the filters 308, 312, 316 may be different from each other.

Figure 5A:
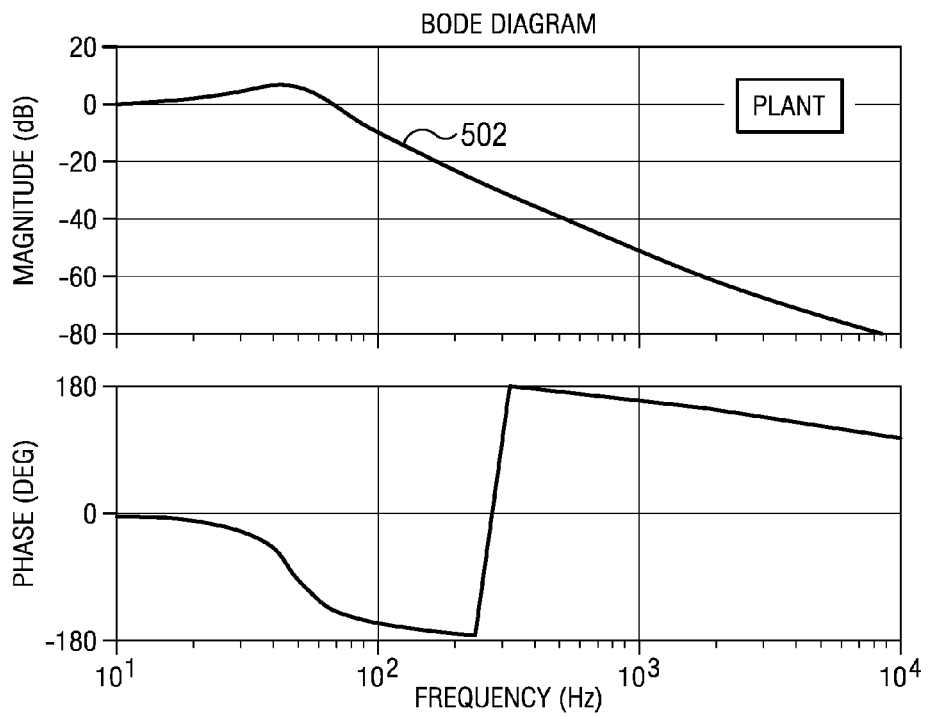
FIGS. 5A-5D illustrate example transfer function plots applying the adaptive compensation scheme using a classical loop shape filter summed with specially designed narrow band filters.
Figure 5B:
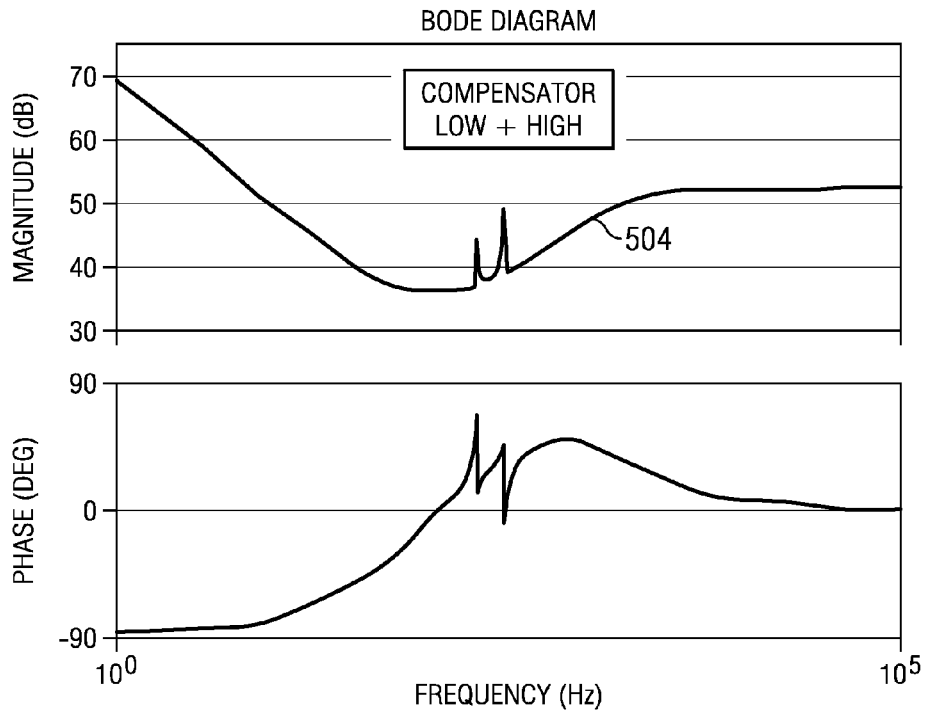

Referring to FIGS. 5A-5D, example transfer function plots applying the adaptive compensation scheme using a classical loop shape filter summed with specially designed narrow band filters are shown. FIG. 5A provides a plot 502 associated with response of the actuator. FIG. 5B provides a plot 504 representative of low and high frequency compensation filter(s). The plot 504 comprises one or more compensation filters. For example, the plot 504 may represent the sum of a low frequency compensation filter and a high frequency narrow band compensation filter. The plot 504 may be examples of the PES based filter, supply reel rotation based filter, and/or the take up reel rotation based filter.

Figure 5C:
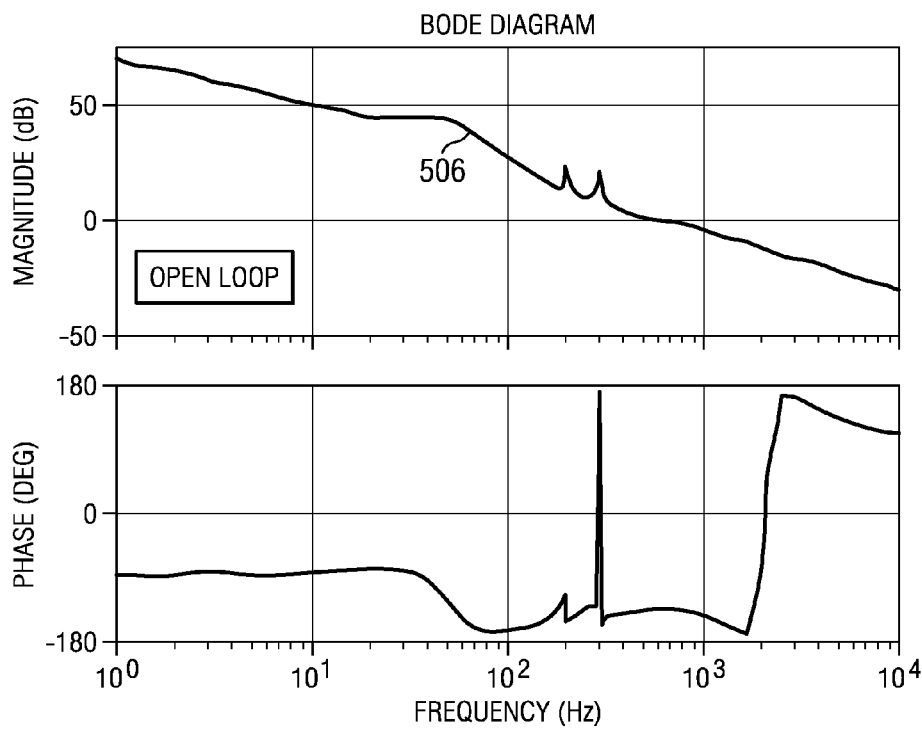
Figure 5D:
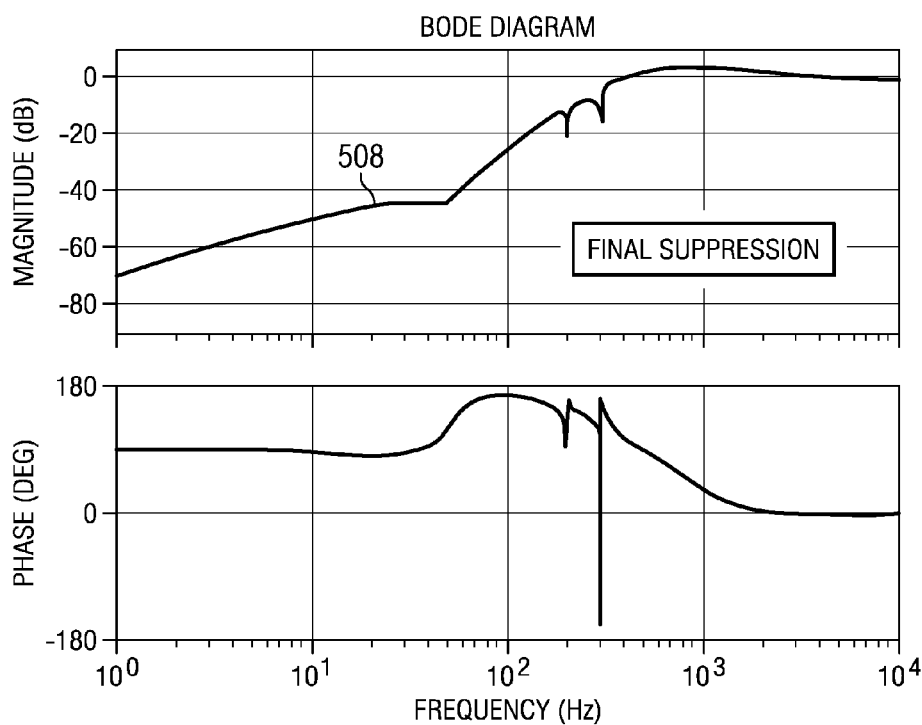

FIG. 5C provides a plot 506 representative of an open loop response function. The open loop response comprises a multiplication of the plots 502 and 504. The plot 506 approaches the 0 dB frequency region where the phase margin of the system is normally large and around 45 degrees. FIG. 5D provides a plot 508 representative of a final suppression function. The final suppression function is defined as 1/(1+open loop). The final suppression function illustrates how well the LTM disturbance is attenuated as a function of frequency. In the frequency region(s) where the magnitude of the final suppression function is at or below 0 dB, good attenuation has been achieved. Above 0 dB, the suppression function is less than optimal. FIG. 5D shows the magnitude getting above 0 dB starting around 400 Hertz, approaching a peak of about 6 to 8 dB, and then leveling off to about 0 dB. The frequency range corresponding to the above 0 dB magnitude is referred to as an amplification region. The amplification region is the most difficult frequency region to address in terms of performance and robustness of the servo design.

Figure 6:
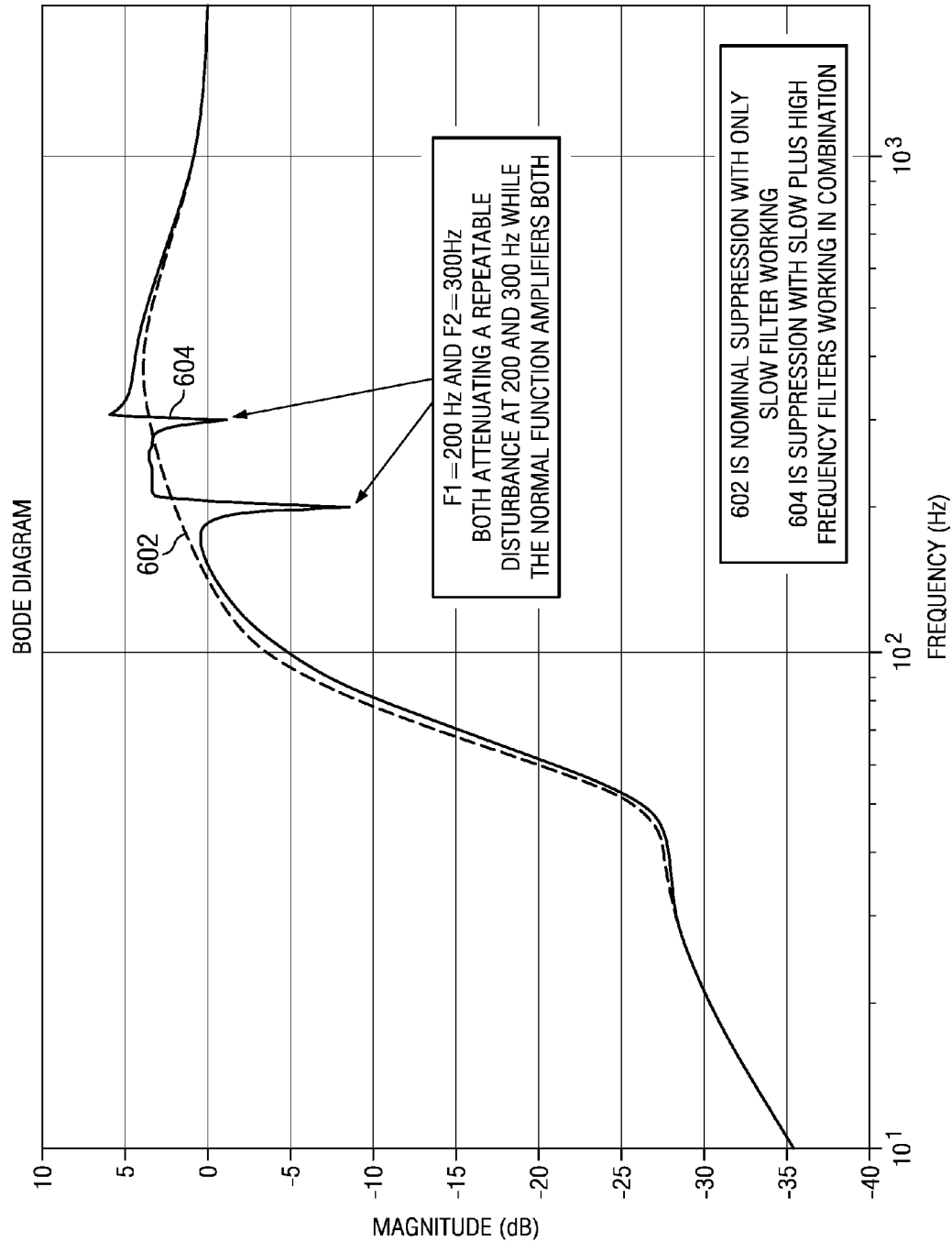
FIG. 6 illustrates a transfer function plot showing a nominal suppression function in which a low frequency filter is used but no high frequency filter is being implemented and an adaptive suppression function with low and high frequency filters working in combination.
Figure 7:
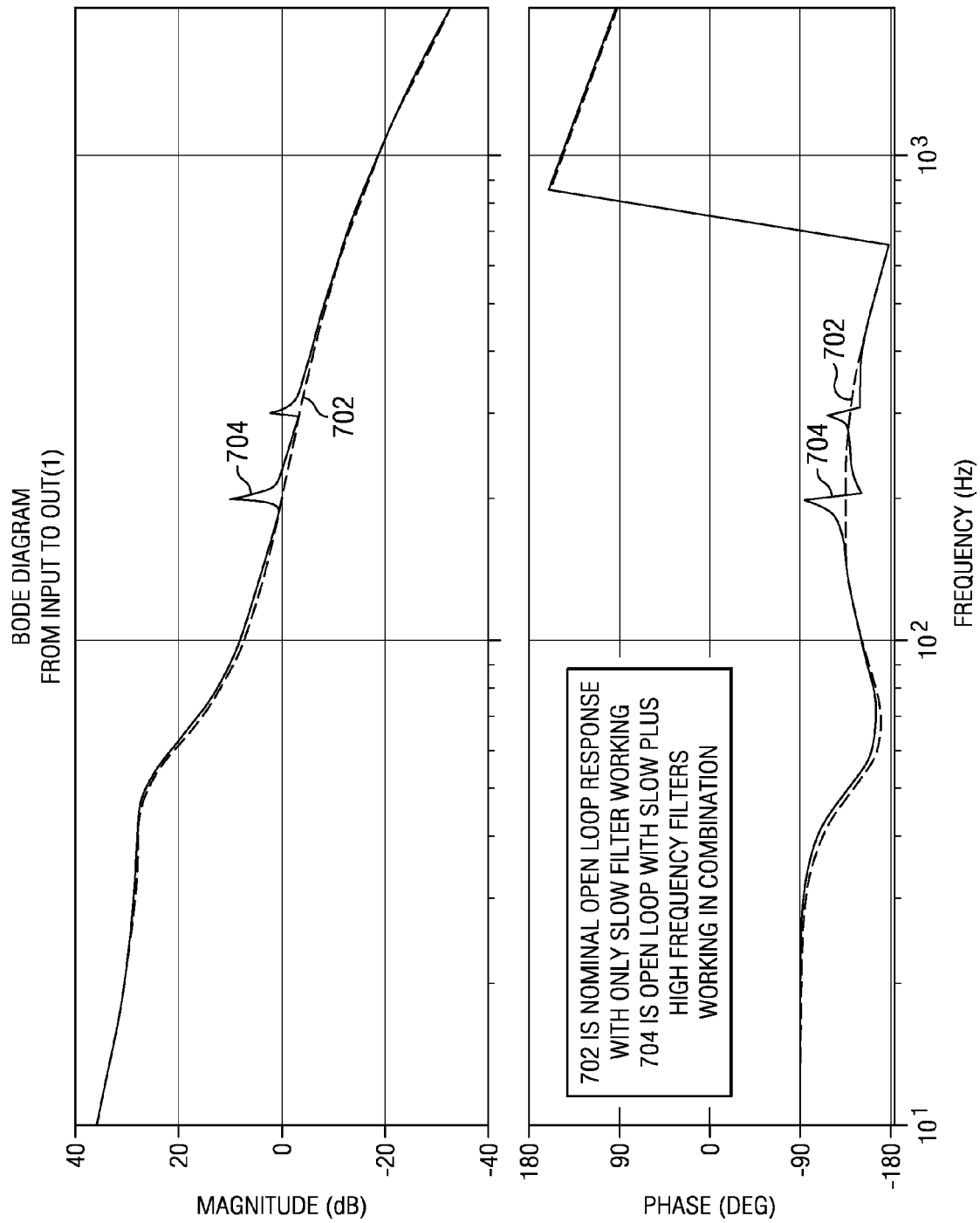
FIG. 7 illustrates a bode plot showing an example open response function corresponding to the nominal suppression function and the adaptive suppression function of FIG. 6.
Figure 8:
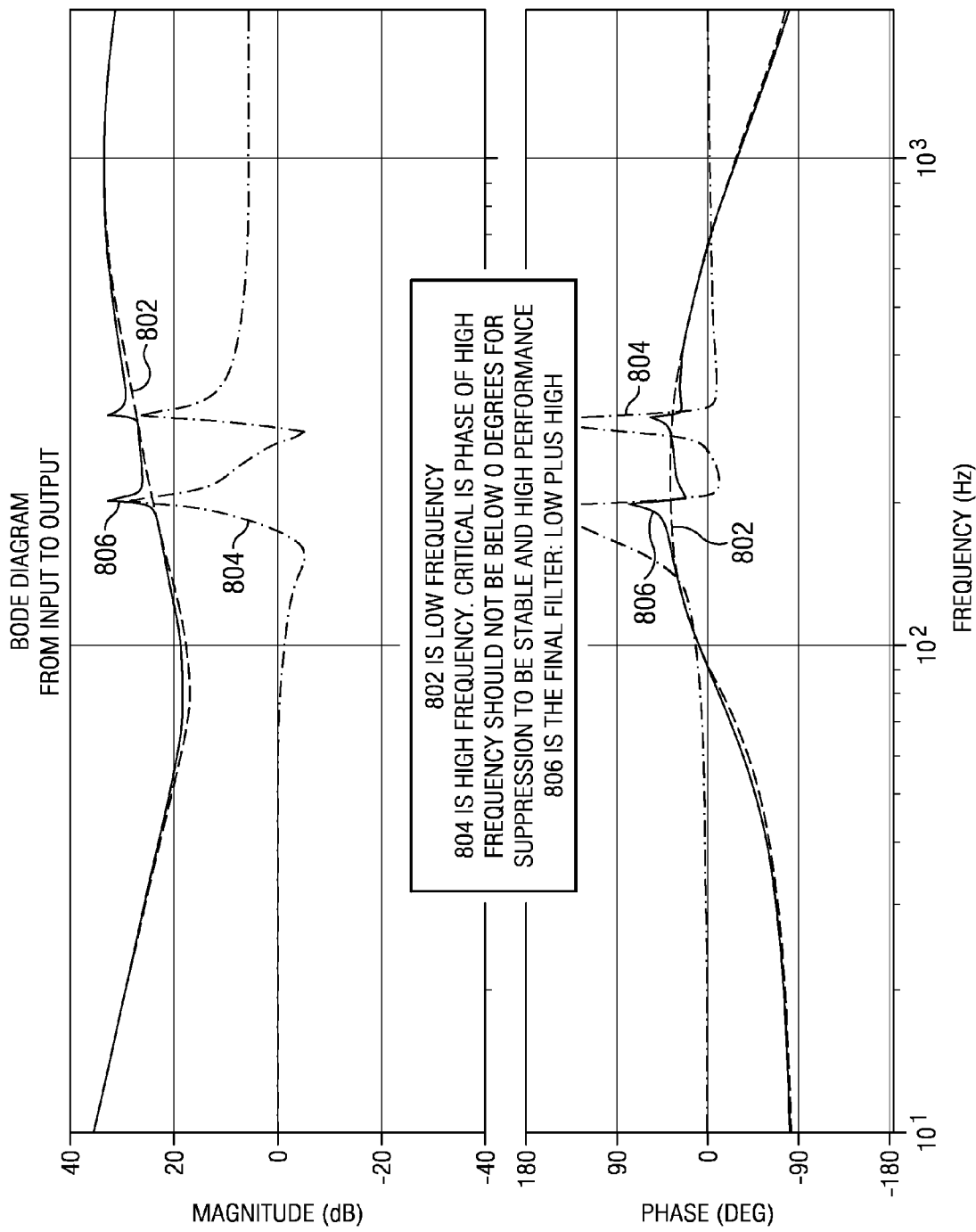
FIG. 8 illustrates a bode plot showing a low frequency filter, a high frequency filter, and a sum of the low and high frequency filters.

If the high frequency narrow band filter is designed such that its maximum frequency is limited to the frequency at which the open loop function's phase reaches −180 degrees, the overall system will be stable and have the characteristics necessary to enable attenuation of disturbances having repeatable frequency characteristics. FIGS. 6-8 illustrate an example where a high frequency filter is designed for two specific disturbance frequencies. Such designed high frequency filter will follow the tape speed, and the overall suppression response will be stable and optimum.

Referring to FIG. 6, a plot 602 shows a nominal suppression function in which a low frequency filter is used but no high frequency filter is being implemented. Note that the plot 602 is above 0 dB from about 160 Hertz to 1750 Hertz, corresponding to poor attenuation of disturbances at those frequencies. A plot 604 shows a suppression function which includes a low frequency filter and a high frequency filter designed to attenuate at frequencies of 200 and 300 Hertz. The plot 604 shows the two narrow bandwidth dips centered at 200 and 300 Hertz. At those frequencies, the plot 604 is below 0 dB, providing better performance than that of the plot 602.

Referring to FIG. 7, a plot 702 is an open response function corresponding to the nominal suppression function of plot 602. A plot 704 is an open response function corresponding to the suppression function of plot 604.

Referring to FIG. 8, a plot 802 represents a low frequency filter, such as the fixed rate filter 304. A plot 804 represents a high frequency narrow bandwidth filter, such as one or more of the PES based filter 308, supply reel based filter 312, or take up reel based filter 318. The high frequency narrow bandwidth filter comprises a two spike filter. For the high frequency narrow bandwidth filter, its phase should not be below approximately zero degree for the overall suppression to be stable and effective. Lastly, a plot 806 represents a sum of the plot 802 and 804.

In this manner, an adaptive media disturbance compensation scheme using multi-rate sampling is provided. The compensation scheme cancels repetitive disturbances occurring in a media drive during read/write operations without requiring a high bandwidth servo loop filter. Instead, the different sources of the disturbance are separately addressed, by applying a separate filter applicable to each of the different sources according to its respectively relevant time interval. In the case of magnetic tape drives, four compensation filters are used in parallel to compensate for dynamic LTM disturbances: a fixed rate filter based on a fixed sampling rate; a PES based filter (also referred to as a tape speed based filter) based on a PES (or tape speed) sampling rate; a supply reel rotation based filter based on a supply reel speed sampling rate; and a take up reel rotation based filter based on a take up reel speed sampling rate. Each of these compensation filters comprises a tunable narrow band amplification filter that is designed to run synchronously to its respective disturbance frequencies, thereby adaptively following and attenuating the disturbance. Precompiled loop shape filters can be utilized based on an exemplary tape speed using a fixed sampling rate (or interrupt time), in which its frequencies are adaptively determined based on respective disturbance parameters.

Therefore, the example compensation scheme provides a number of advantages, such as adaptive attenuation of the roller induced LTM disturbance as the tape drive operates dynamically over a wide range of linear tape speeds, and adaptive attenuation of the supply reel and take up reel induced LTM disturbances as the tape drive operates dynamically over a wide range of linear tape speeds. High bandwidth loop filters are no longer required since the compensation focuses on specific frequencies at which the disturbances occur. The example compensation scheme does not require predicting the disturbance characteristics or modeling the actuator to determine the disturbance characteristics. Intensive computations are also not required; the present compensation scheme can be implemented using a standard microprocessor.

In this document, the terms "computer program product," "computer-readable medium," and the like may be used generally to refer to media such as, for example, memory, storage device, or a storage unit. These and other forms of computer-readable media may be involved in storing one or more instructions for use by the microprocessor 126, to cause the processor to perform specified operations. Such instructions, generally referred to as "computer program code" (which may be grouped in the form of computer programs or other groupings), when executed, enable the tape drive 102 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded the tape drive 102 using, for example, removable storage drive or a communications interface. The control logic (in this example, software instructions or computer program code), when executed by the microprocessor 126, causes the microprocessor 126 to perform the functions of the invention as described herein.

It will be appreciated that, for clarity purposes, the above description described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A data storage media drive providing adaptive disturbance compensation, comprising:
a read/write head including at least one servo element;
a servo signal processing circuit coupled to the servo element to output a position error signal;
one or more rollers in contact with a data storage media;
an actuator coupled to, and configured to control positions of, the read/write head; and
a processor in communication with the actuator and the servo signal processing circuit and configured to provide a least one filtered position error signal to the actuator to compensate for a position displacement between the read/write head and a track of the data storage media, wherein the filtered position error signal comprises a sum of respective outputs of a plurality of compensation filters, each of the compensation filters corresponding to a specific source of disturbance contributing to the position displacement, the one or more rollers being a source of disturbance contributing to the position displacement, each of the compensation filters having a sampling rate relating to the respective specific source of disturbance, and the compensation filter for a roller induced disturbance having a sampling rate based on a position error signal (PES).

2. The media drive of claim 1, wherein the actuator is one of the specific sources of disturbance contributing to the position displacement.

3. The media drive of claim 2, wherein the compensation filter for an actuator related disturbance has a fixed sampling rate.

4. The media drive of claim 1, wherein the data storage media comprises magnetic tape storage media and the compensation filter for a roller induced disturbance has a sampling rate based on a tape speed.

5. The media drive of claim 1, further comprising a tape reel to access magnetic tape included in the date data storage media.

6. The media drive of claim 5, wherein the tape reel is one of the specific sources of disturbance contributing to the position displacement.

7. The media drive of claim 6, wherein the compensation filter for a tape reel induced disturbance has a sampling rate based on a tape reel rotation rate.

8. The media drive of claim 5, wherein the tape reel comprises a take up tape reel.

9. The media drive of claim 5, wherein the tape reel comprises a take up tape reel.

10. The media drive of claim 1, wherein each of the compensation filters is adaptively configured based on respective sampling rates to attenuate respective disturbances at the respective disturbance frequencies.

11. The media drive of claim 1, wherein the position displacement comprises lateral position displacement.

12. The media drive of claim 1, wherein at least one of the compensation filters comprises a narrow bandwidth filter.

13. A computerized method for providing adaptive compensation of disturbances relating to read/write positions in a data storage media drive, comprising:
obtaining a position error signal;
configuring a first compensation filter based on a first sampling rate, wherein the first compensation filter is configured to attenuate a first type of disturbance contributing to the position error signal;
configuring a second compensation filter based on a second sampling rate, wherein the second compensation filter is configured to attenuate a second type of disturbance comprising a roller induced disturbance contributing to the position error signal, and wherein the first and second sampling rates are different from each other;
combining outputs of the first and second compensation filters; and updating a read/write head position of the date storage media drive relative to a track of a data storage media using the combined outputs of the first and second compensation filters.

14. The method of claim 13, wherein combining outputs of the first and second compensation filters comprises summing the first and second compensation filters.

15. The method of claim 13, wherein the first sampling rate comprises a fixed sampling rate regardless of a tape speed.

16. The method of claim 13 wherein the first type of disturbance comprises a mechanical disturbance.

17. The method of claim 13, wherein the second sampling rate is based on a rate at which the position error signal is obtained.

18. The method of claim 13, further comprising:
configuring a third compensation filter based on a third sampling rate, wherein the third compensation filter is configured to attenuate a third type of disturbance contributing to the position error signal;
configuring a fourth compensation filter based on a fourth sampling rate, wherein the fourth compensation filter is configured to attenuate a fourth type of disturbance contributing to the position error signal; and
combining outputs of the first, second, third, and fourth compensation filters.

19. The method of claim 18, wherein the third and fourth sampling rates are different from each other.

20. The method of claim 18, wherein the third sampling rate is based on a supply reel rotation rate.

21. The method of claim 18, wherein the third type of disturbance comprises a supply reel rotation disturbance.

22. The method of claim 18, wherein the fourth sampling rate is based on a take up reel rotation rate.

23. The method of claim 18, wherein the fourth type of disturbance comprises a take up reel rotation disturbance.

24. The method of claim 13, wherein configuring the first compensation filter comprises configuring a filter shape at attenuation frequencies corresponding to frequencies at which the first type of disturbance is occurring.

25. The method of claim 13, wherein at least one of the compensation filters comprises a narrow bandwidth filter.

26. A non-transitory computer readable medium comprising program code for providing adaptive LTM disturbance compensation, the program code for:
dynamically determining, in a processor, at least one attenuation frequency of a first compensation filter in accordance with at least one frequency of a first type of disturbance;
dynamically determining, in the processor, at least one attenuation frequency of a second compensation filter in accordance with a least one frequency of a second type of disturbance; and
summing, in the processor, the first and second compensation filters, wherein the first type of disturbance comprises a fixed mechanical disturbance and the second type of disturbance comprises at least one of a roller induced disturbance, and the second compensation filter for compensating for the roller induced disturbance having a sampling rate based on a position error signal (PES).

27. The non-transitory computer readable medium of claim 26, wherein each of the first and second compensation filters is dynamically determined at a first and second sampling rate, respectively.

28. The non-transitory computer readable medium of claim 27, wherein the first and second sampling rates are different from each other.

29. The non-transitory computer readable medium of claim 26, further comprising program code for:
dynamically determining in the processor, at least one attenuation frequency of a third compensation filter in accordance with at least one frequency of a third type of disturbance;
dynamically determining, in the processor, at least one attenuation frequency of a fourth compensation filter in accordance with at least one frequency of a fourth type of disturbance; and
summing, in the processor, the first, second, third, and fourth compensation filters.

30. The non-transitory computer readable medium of claim 29, wherein the third type of disturbance comprises a supply reel rotation induced disturbance, and the fourth type of disturbance comprises a take up reel rotation induced disturbance.

31. The non-transitory computer readable medium of claim 29, wherein the sum of the first, second, third, and fourth compensation filters comprises compensation of lateral tape motion (LTM) disturbance.

* * * * *